(12) United States Patent
Nagai

(10) Patent No.: US 11,486,284 B2
(45) Date of Patent: Nov. 1, 2022

(54) HEAT EXCHANGE DEVICE

(71) Applicant: SANKEI GIKEN KOGYO CO., LTD., Tokyo (JP)

(72) Inventor: Takanori Nagai, Isesaki (JP)

(73) Assignee: SANKEI GIKEN KOGYO CO., LTD., Tokyo (JP)

( * ) Notice: Subject to any disclaimer, the term of this patent is extended or adjusted under 35 U.S.C. 154(b) by 0 days.

(21) Appl. No.: 17/422,484

(22) PCT Filed: Jan. 5, 2020

(86) PCT No.: PCT/JP2020/000005
§ 371 (c)(1),
(2) Date: Jul. 13, 2021

(87) PCT Pub. No.: WO2020/153106
PCT Pub. Date: Jul. 30, 2020

(65) Prior Publication Data
US 2022/0065153 A1 Mar. 3, 2022

(30) Foreign Application Priority Data

Jan. 22, 2019 (JP) .............................. JP2019-008822

(51) Int. Cl.
*F01N 3/02* (2006.01)
(52) U.S. Cl.
CPC ........ *F01N 3/0205* (2013.01); *F01N 2240/02* (2013.01); *F01N 2240/36* (2013.01)
(58) Field of Classification Search
CPC ............... F01N 3/0205; F01N 2240/02; F01N 2240/36; F02M 26/25; F02M 26/26
See application file for complete search history.

(56) References Cited

U.S. PATENT DOCUMENTS

2006/0016582 A1* 1/2006 Hashimoto ........... F28D 7/1684
165/109.1
2011/0088672 A1* 4/2011 Prior ..................... F02M 26/26
60/320
(Continued)

FOREIGN PATENT DOCUMENTS

GB 2473821 A * 3/2011 ............. F02M 26/24
JP 2007-247555 A 9/2007
(Continued)

OTHER PUBLICATIONS

Machine translation of JP2010180818A, accessed Mar. 9, 2022. (Year: 2022).*
(Continued)

Primary Examiner — Jonathan R Matthias
(74) Attorney, Agent, or Firm — WHDA, LLP

(57) ABSTRACT

Provided is a heat exchange device 1 in which: a heat exchange path composed of a plurality of heat exchange branch paths ER1 and ER2 and a detour path DR are provided inside a base structure 2 having a fluid introducing portion 21 and a fluid discharging portion 22; a heat exchange portion 4 through which a heating target fluid is arranged in each of the heat exchange branch paths ER1 and ER2; and a switching portion is provided that can switch a flow of heated fluid circulating through the base structure 2 so as to be regulated to either the heat exchange path or the detour path DR. A heat exchange device having excellent heat exchange performance and capable of shortening the length and reducing the size is provided.

4 Claims, 5 Drawing Sheets

(56) References Cited

U.S. PATENT DOCUMENTS

| | | | |
|---|---|---|---|
| 2015/0176445 A1* | 6/2015 | Han | F01M 5/001 123/568.12 |
| 2015/0241138 A1 | 8/2015 | Veitch | |
| 2018/0073412 A1 | 3/2018 | Ekstrom et al. | |
| 2020/0072104 A1* | 3/2020 | Cho | F01N 3/043 |

FOREIGN PATENT DOCUMENTS

| JP | 2010-180818 A | 8/2010 |
|---|---|---|
| JP | 2012-31796 A | 2/2012 |
| JP | 2018-127958 A | 8/2018 |

OTHER PUBLICATIONS

International Search Report dated Mar. 17, 2020, issued in counterpart application No. PCT/JP2020/000005 (3 pages).

\* cited by examiner

HEAT EXCHANGE DEVICE

TECHNICAL FIELD

The present invention relates to a heat exchange device that exchanges heat with, for example, exhaust heat of an internal combustion engine of an automobile.

BACKGROUND ART

Conventionally, exhaust heat recovery devices of Patent Literatures 1 and 2 are known as heat exchange devices that exchange heat with exhaust heat of an internal combustion engine of an automobile. These exhaust heat recovery devices are provided with a heat exchange path and a detour path arranged one above the other inside a substantially cylindrical base structure having an exhaust introducing portion and an exhaust discharging portion, and a heat exchange portion in which cooling water flows is arranged in the heat exchange path. Circulation of exhaust gas to the heat exchange path and circulation of exhaust gas to the detour path are switched by tilting of valves provided on the upstream side of the heat exchange path and the detour path whereby necessary heat exchange is performed.

CITATION LIST

Patent Literature

[PTL 1] Japanese Patent Application Publication No. 2012-31796
[PTL 2] Japanese Patent Application Publication No. 2018-127958

SUMMARY OF INVENTION

Technical Problem

By the way, the exhaust heat recovery devices of Patent Literatures 1 and 2 switch the circulation of exhaust gas to the upper heat exchange path and the lower detour path. However, if the exhaust gas of the heated fluid is circulated to the heat exchange path with this structure, the temperature of the exhaust gas decreases abruptly as the fluid flows downstream, and the heat exchange efficiency decreases abruptly. In order to cope with this sudden drop in heat exchange efficiency and obtain the required heat exchange performance, it is necessary to increase the heat exchange area of the heat exchange portion, and the total length and size of the heat exchange portion and the exhaust heat recovery device will be considerably large. Since heat exchange devices are often installed in a limited space such as an automobile body, there is a demand for smaller heat exchange devices with excellent heat exchange performance.

The present invention has been proposed in view of the above problems, and an object of the present invention is to provide a heat exchange device having excellent heat exchange performance and capable of shortening the length and reducing the size.

Solution to Problem

A heat exchange device of the present invention is configured such that: a heat exchange path composed of a plurality of heat exchange branch paths and a detour path are provided inside a base structure having a fluid introducing portion and a fluid discharging portion; a heat exchange portion is arranged in each of the heat exchange branch paths; and a switching portion is provided that can switch a flow of heated fluid circulating through the base structure so as to be regulated to at least either the heat exchange path or the detour path.

According to this configuration, heated fluid flows to the plurality of heat exchange branch paths in which the heat exchange portion is arranged at the time of heat exchange. In this way, the range in which heat can be exchanged between the heated fluid having a higher temperature and the heating target substance can be increased, and heat exchange can be performed efficiently to obtain excellent heat exchange performance. In addition, since the range in which heat can be exchanged between the heated fluid having a higher temperature and the heating target substance can be increased, it is not necessary to increase the heat exchange area of the heat exchange portion and lengthen the total length of the heat exchange portion and the heat exchange device. Therefore, the length and the size of the heat exchange portion and the heat exchange device can be reduced.

A heat exchange device of the present invention is configured such that: a heat exchange path composed of a plurality of heat exchange branch paths and a detour path are provided inside a base structure having a fluid introducing portion and a fluid discharging portion; A heat exchange portion is arranged in each of the heat exchange branch paths; and a switching portion is provided that can switch a flow of a heating target fluid circulating through the base structure so as to be regulated to at least either the heat exchange path or the detour path.

According to this configuration, heating target fluid flows to the plurality of heat exchange branch paths in which the heat exchange portion is arranged at the time of heat exchange. In this way, the range in which heat can be exchanged between the heated substance having a higher temperature and the heating target fluid can be increased, and heat exchange can be performed efficiently to obtain excellent heat exchange performance. In addition, since the range in which heat can be exchanged between the heated substance body having a higher temperature and the heating target fluid can be increased, it is not necessary to increase the heat exchange area of the heat exchange portion and lengthen the total length of the heat exchange portion and the heat exchange device. Therefore, the length and the size of the heat exchange portion and the heat exchange device can be reduced.

In the heat exchange device of the present invention, the heat exchange portion includes a plurality of flat circulation tubes arranged side by side at intervals in a thickness direction, and a flat surface of the flat circulation tube through which fluid flows extends in a flow direction of the fluid flowing through the base structure.

According to this configuration, the heat exchange area can be increased by the flat surface of the flat circulation tube, and heat exchange can be performed more efficiently. Moreover, the length or distance of the flat surface extending in the fluid flow direction of the base structure can be shortened, and the length of the heat exchange portion composed of the flat circulation tube can be shortened. Further, due to the shape and arrangement of the flat circulation tubes, the pressure loss of the fluid circulating through the base structure can be reduced, and a smooth fluid flow can be ensured. For example, when the exhaust gas of an internal combustion engine of an automobile flows in the base structure, the back pressure of the internal combustion engine can be reduced by the reduced pressure loss, and the exhaust efficiency, the intake efficiency, and the combustion efficiency of the internal combustion engine can be improved.

In the heat exchange device of the present invention, a plurality of heat exchange branch paths are arranged at predetermined intervals in a circumferential direction of the base structure, and the detour path is arranged inside the plurality of heat exchange branch paths.

According to this configuration, the detour path is arranged inside the plurality of heat exchange branch paths arranged at predetermined intervals. Therefore, it is possible to basically maintain the flow of the fluid from the fluid introducing portion during non-heat exchange and allow it to flow through the detour path. Moreover, it is possible to distribute the flow of the fluid from the fluid introducing portion in a substantially equalized manner during heat exchange to allow the fluid to flow through the heat exchange branch paths without causing a large change such that a large turbulent flow or a large vortex flow is generated. That is, the pressure loss of the fluid circulating through the base structure can be reduced during both non-heat exchange and during heat exchange, and a smoother fluid flow can be ensured. For example, when the exhaust gas of an internal combustion engine of an automobile flows in the base structure, the back pressure of the internal combustion engine can be reduced by the reduced pressure loss, and the exhaust efficiency, the intake efficiency, and the combustion efficiency of the internal combustion engine can be improved.

In the heat exchange device of the present invention, a bulging portion is formed between the fluid introducing portion and the fluid discharging portion of the base structure so as to bulge on both sides, the heat exchange path includes a first heat exchange branch path and a second heat exchange branch path, the first heat exchange branch path and the second heat exchange branch path are provided on one side and the other side of the bulges on both sides of the bulging portion, and the detour path is arranged between the first heat exchange branch path and the second heat exchange branch path.

According to this configuration, the detour path is arranged between the first heat exchange branch path on one side of the bulges on both sides of the bulging portion and the second heat exchange branch path on the other side. Therefore, it is possible to secure a desirable flow path diameter through which the fluid circulates during both heat exchange and non-heat exchange. Further, it is possible to basically maintain the flow of the fluid from the fluid introducing portion during non-heat exchange and allow it to flow through the detour path. Moreover, it is possible to distribute the flow of the fluid from the fluid introducing portion in a substantially equalized manner during heat exchange to allow the fluid to flow through the first heat exchange branch path and the second heat exchange branch path without causing a large change such that a large turbulent flow or a large vortex flow is generated. Therefore, the pressure loss of the fluid circulating through the base structure can be further reduced during both non-heat exchange and during heat exchange, and a smoother fluid flow can be ensured.

In the heat exchange device of the present invention, the switching portion includes a first tilt valve that regulates the inflow of the fluid circulating through the base structure into the first heat exchange branch path, and a second tilt valve that regulates the inflow of the fluid circulating through the base structure into the second heat exchange branch path, and the first valve plate portion of the first tilt valve and the second valve plate portion of the second tilt valve are in contact with each other so that the tips thereof form a substantially V-shape toward the upstream side, and either one tip covers the other tip, and regulate the inflow of the fluid circulating through the base structure into the detour path.

According to this configuration, the first valve plate portion of the first tilt valve that regulates the inflow of the fluid into the first heat exchange branch path and the second valve plate portion of the second tilt valve that regulates the inflow of the fluid into the second heat exchange branch path are in contact with each other so that the tips thereof form a substantially V-shape toward the upstream side. Therefore, the flow of fluid can be equalized by the first heat exchange branch path and the second heat exchange branch path, and the pressure loss of the fluid can be further reduced. Further, the tip of either the first valve plate or the second valve plate covers the other tip to regulate the inflow of the fluid into the detour path. Therefore, the inflow of fluid into the detour path can be more reliably regulated during heat exchange. Further, since the tip of either the first valve plate or the second valve plate covers the other tip, the contact and the closed state of the first valve plate portion and the second valve plate portion whose tips face the upstream side can be more reliably prevented from being released due to the flow of the fluid in the base structure.

In the heat exchange device of the present invention, a usage path of the heated fluid or the heating target fluid circulating through the base structure is provided in the base structure separately from the heat exchange path and the detour path, and the switching portion can introduce a portion of the flow of the heated fluid or the heating target fluid circulating through the base structure into the usage path.

According to this configuration, the heated fluid or the heating target fluid introduced into the usage path can be utilized for various purposes such as, for example, heating the wall surface on which a thermoelectric conversion element is arranged, generating power by a power generation device in which a thermoelectric conversion element is arranged, or cooling the wall surface in addition to the heat exchange function.

Advantageous Effects of Invention

The heat exchange device of the present invention can exhibit excellent heat exchange performance and shorten the length to reduce the size.

DESCRIPTION OF EMBODIMENTS

Figure 1:
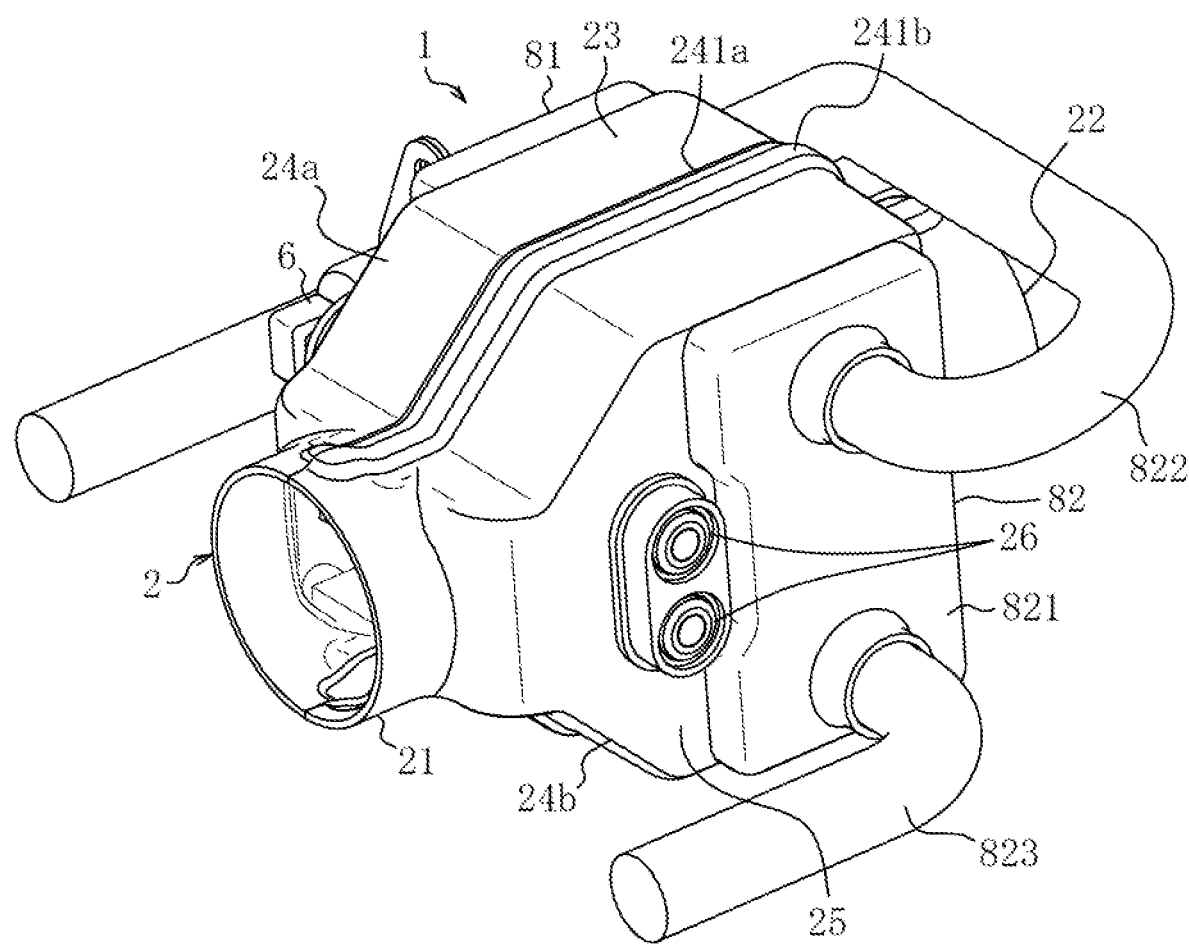
FIG. 1 is a perspective view of a heat exchange device according to an embodiment of the present invention.
Figure 2:
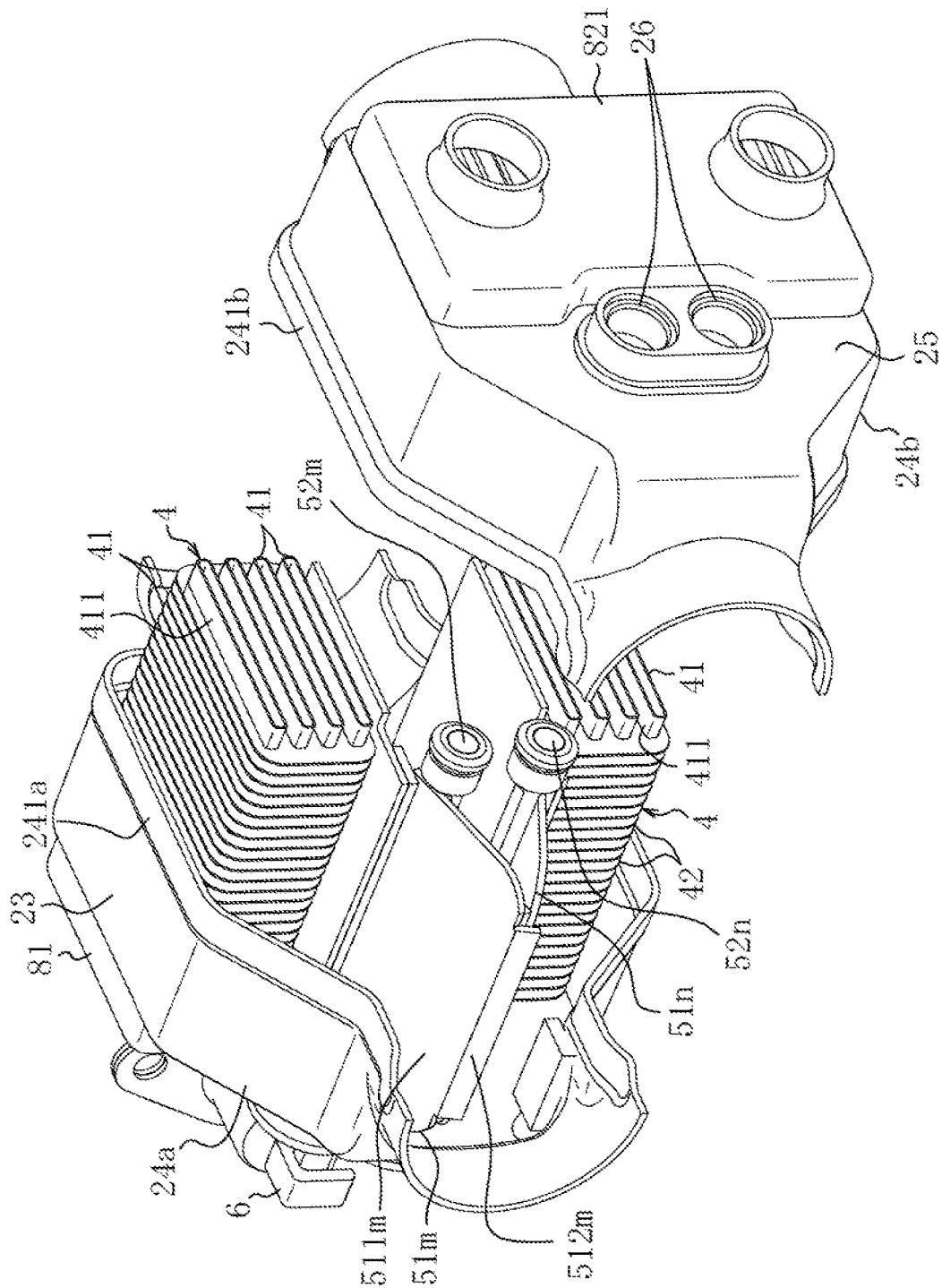
FIG. 2 is an exploded perspective explanatory view of the heat exchange device of the embodiment.

[Exhaust Heat Recovery Device According to Embodiment]

As illustrated in FIGS. 1 to 4, a heat exchange device 1 according to an embodiment of the present invention has a substantially cylindrical base structure 2, a substantially cylindrical fluid introducing portion 21 is provided at one end of the base structure 2, and a substantially cylindrical fluid discharging portion 22 is provided at the end of the base structure 2. A bulging portion 23 is formed between the fluid introducing portion 21 and the fluid discharging portion 22 of the base structure 2 in a shape that bulges on both sides, and the bulging portion 23 bulges outward so that a wide space is formed therein. The base structure 2 is formed in a substantially tubular shape having a bulge in the middle portion as a whole. The base structure 2 of the present embodiment is formed such that the axis of the substantially cylindrical fluid introducing portion 21 and the axis of the substantially cylindrical fluid discharging portion 22 substantially coincide with each other. The bulging portion 23 is formed so as to protrude laterally on both sides from the fluid introducing portion 21 and the fluid discharging portion 22. Further, in the present embodiment, a heated fluid such as exhaust gas flows from the fluid introducing portion 21 of the base structure 2 toward the fluid discharging portion 22.

The base structure 2 is formed by bonding a pair of half bodies 24a and 24b. The half bodies 24a and 24b have a shape in which the base structure 2 is divided into two parts in the axial direction of the fluid introducing portion 21 and the fluid discharging portion 22 and the protruding direction of the bulging portion 23, and the half bodies 24a and 24b have substantially the same shape and substantially the same size. The mating portions of the half body 24a and the half body 24b are formed such that the end surface of the upstream-side end of the fluid introducing portion 21 and the downstream-side end of the fluid discharging portion 22 abut each other and intermediate portions thereof inflate outward due to a height difference of a fitting portion 241a and a fitting target portion 241b so that the fitting portion 241a is fitted to an inner portion of the fitting target portion 241b. Then, the abutting end surfaces and an overlapping surface of the fitting portion 241a and the fitting target portion 241b or the end of the fitting target portion 241b are welded by laser welding or the like, and the half body 24a and the half body 24b are bonded and integrated as the base structure 2.

Separators 3m and 3n are positioned and fixed to a wall portion 25 corresponding to the bulging portion 23 of the base structure 2 at positions separated from the outer ends of the bulging portion 23 by predetermined distances, respectively. A first heat exchange branch path ER1 is provided between the outer end on one side of the bulging portion 23 and the separator 3m, a second heat exchange branch path ER2 is provided between the outer end on the other side of the bulging portion 23 and the separator 3n, and a detour path DR is provided between the separator 3m and the separator 3n. The first heat exchange branch path ER1 and the second heat exchange branch path ER2 are formed on one side and the other side of the bulges on both sides of the bulging portion 23. The detour path DR is arranged between the first heat exchange branch path ER1 and the second heat exchange branch path ER2. In the present embodiment, the first heat exchange branch path ER1 and the second heat exchange branch path ER2 form a heat exchange path, and the heat exchange path composed of the plurality of heat exchange branch paths ER1 and ER2 and the detour path DR are provided inside the base structure 2.

A heat exchange portion 4 through which a heating target fluid such as cooling water circulates is arranged in each of the heat exchange branch paths ER1 and ER2. The heat exchange portion 4 of the present embodiment includes a plurality of flat circulation tubes 41 having a flat shape and a plurality of fins 42. A plurality of flat circulation tubes 41 are arranged side by side at intervals in the thickness direction, and are bridged between the half bodies 24a and 24b so that both ends are fitted to through-holes (not illustrated) formed in the wall portions 25 of the half bodies 24a and 24b. The flat surface 411 of the flat circulation tube 41 extends in the flowing direction of the fluid that circulates through the base structure 2. The fluid circulating through the heat exchange branch paths ER1 and ER2 flows around the plurality of flat circulation tubes 41 stacked at intervals. The plurality of fins 42 are provided so as to be externally fitted onto the plurality of flat circulation tubes 41 arranged side by side at predetermined intervals in the pipeline direction of the flat circulation tube 41, and the heat transfer area for heat exchange is increased by the fins 41.

A switching portion that can be switched so that the flow of the heated fluid circulating through the base structure 2 is regulated to either the heat exchange path or the detour path DR is provided on the upstream side of the separators 3m and 3n in the base structure 2. The switching portion of the present embodiment includes a first tilt valve 5m that regulates the inflow of the fluid circulating through the base structure 2 into the first heat exchange branch path ER1 and a second tilt valve 5n that regulates the inflow of the fluid circulating through the base structure 2 into the second heat exchange branch path ER2.

The first tilt valve 5m includes a first valve plate portion 51m and a shaft portion 52m fixed to the root of the first valve plate portion 51m. The first valve plate portion 51m has a shape having a flat plate-shaped base portion 511m and a plate-shaped covering portion 512m bent in a substantially V-shape at the tip of the base portion 511m. A receiving portion 513m for receiving a second valve plate portion 51n described later is provided on the inner side of the covering portion 512m.

The second tilt valve 5n includes a second valve plate portion 51n and a shaft portion 52n fixed to the root of the second valve plate portion 51n. The second valve plate portion 51n has a flat plate shape as a whole. At the time of heat exchange, the tip of the second valve plate portion 51n is brought into contact with the receiving portion 513m of the first valve plate portion 51m, and the first valve plate portion 51m of the first tilt valve 5m and the second valve plate portion 51n of the second tilt valve 5n are in contact with each other so that the tips thereof form a substantially V-shape toward the upstream side of the fluid flow. The tip of the second valve plate 51n is covered with the covering portion 512m at the tip of the first valve plate portion 51m to regulate the inflow of the fluid circulating through the base structure into the detour path DR. It is also possible that the tip of the second valve plate portion 51n comes into contact with the tip of the first valve plate portion 51m so as to cover the tip.

The shaft portion 52m of the first tilt valve 5m and the shaft portion 52n of the second tilt valve 52n are inserted into the bearings 26 of the wall portions 25 of the half bodies 24a and 24b, respectively, so that the shaft portions 52m and 52n are tiltably supported and are bridged between the half bodies 24a and 24b. The shaft portion 52m of the first tilt valve 5m and the shaft portion 52n of the second tilt valve 52n are connected to a thermal actuator 6 that is driven by detecting the temperature of a heating target fluid flowing from the flat circulation tube 41 into a fluid connecting unit 81 described later and are tilted by the control and driving of the thermal actuator 6. The mechanism for driving and controlling the first tilt valve 5*m* and the second tilt valve 5*n*, which correspond to the switching portion, can be appropriately modified within the scope of the spirit of the present invention as long as the mechanism can operate the first tilt valve 5*m* and the second tilt valve 5*n* at the same time so as to be open and closed. For example, the mechanism may switch the switching portion according to manual input or a control command from a control device based on satisfaction of a predetermined condition. Further, a receiving portion 7*m* with which the first valve plate portion 51*m* comes into contact and a receiving portion 7*n* with which the second valve plate portion 51*n* comes into contact with when heat exchange is not performed or in an open state of the tilt valve are arranged at the downstream end of the fluid introducing portion 21 in the base structure 2.

Circulation connection units 81 and 82 for introducing and discharging the fluid to be circulated in the flat circulation tube 41 are provided and fixed to the outer side of the through-hole to which the end of the flat circulation tube 41 of the base structure 2 is fitted. The circulation connection unit 81 has a cover shape that covers the entire outer side of a through-hole to which the end of the flat circulation tube 41 of the heat exchange branch path ER1 is fitted and a through-hole to which the end of the flat circulation tube 41 of the heat exchange branch path ER2 is fitted on one side end. The fluid flowing through the flat circulation tube 41 of the heat exchange branch path ER1 and the fluid flowing through the flat circulation tube 41 of the heat exchange branch path ER2 are recirculated in a series of inner spaces of the circulation connection unit 81.

The circulation connection unit 82 includes a connecting cover 821 that covers the entire outer side of the through-hole to which the end of the flat circulation tube 41 of the heat exchange branch ER1 is fitted and the through-hole to which the end of the flat circulation tube 41 of the heat exchange branch ER2 is fitted on the other side, a fluid introduction pipe 822 connected to the connecting cover 821, and a fluid discharging pipe 823 connected to the connecting cover 821. A space corresponding to the flat circulation pipe 41 of the heat exchange branch road ER1 and a space corresponding to the flat circulation tube 41 of the heat exchange branch road ER2 are partitioned in the inner space of the connecting cover 821.

The heating target fluid flows from the fluid introduction pipe 822 into the space corresponding to the flat circulation tube 41 of the heat exchange branch path ER1 of the connecting cover 821. The heating target fluid flowing through the flat circulation tube 41 of the heat exchange branch path ER1 is recirculated into the flat circulation tube 41 of the heat exchange branch path ER2 by the circulation connection unit 81. The heating target fluid flowing through the flat circulation tube 41 of the heat exchange branch path ER2 flows into the space corresponding to the flat circulation tube 41 of the heat exchange branch path ER2 of the connecting cover 821. The heating target fluid flows from the connecting cover 821 to the fluid discharging pipe 823.

Figure 3:
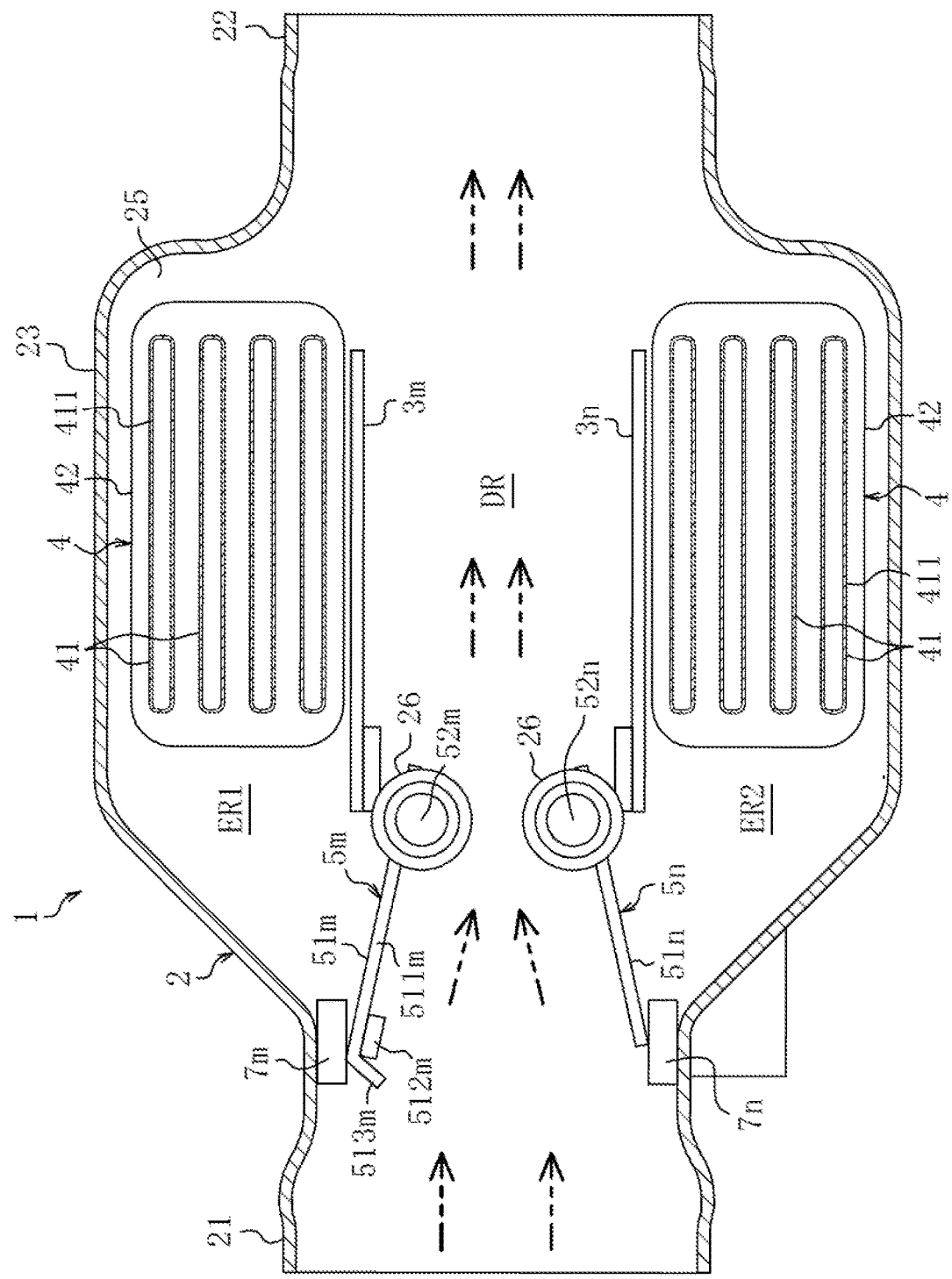
FIG. 3 is a longitudinal section explanatory view of a heat exchange stopped state of the heat exchange device of the embodiment.

In the heat exchange device 1 of the present embodiment, for example, the base structure 2 is connected to the exhaust pipeline of the internal combustion engine of an automobile, and a heated fluid such as exhaust gas is circulated through the base structure 2. Further, a heating target fluid such as cooling water, oil, and air is circulated through the flat circulation tube 41 of the heat exchange portion 4. Then, when the first valve plate portion 51*m* of the first tilt valve 5*m* and the second valve plate portion 51*n* of the second tilt valve 52*n* are in the open state, as illustrated in FIG. 3, the heated fluid circulates through the detour path DR of the base structure 2 as indicated by the thick line two-dot chain line arrow.

Figure 4:
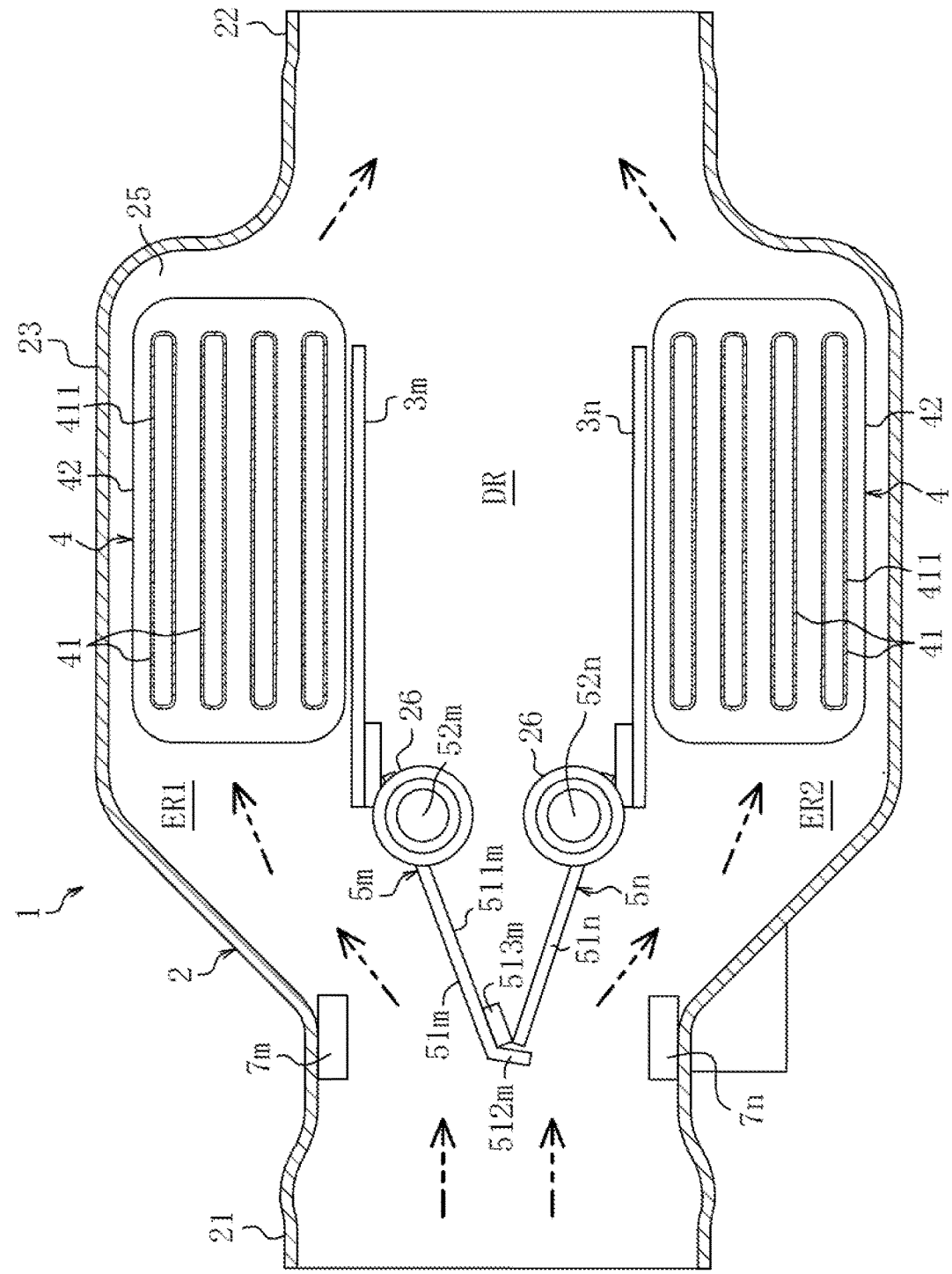
FIG. 4 is a longitudinal section explanatory view of a heat exchange state of the heat exchange device of the embodiment.

Further, for example, when the temperature of the heating target fluid drops below a predetermined temperature, and the thermal actuator 6 closes the first valve plate portion 51*m* of the first tilt valve 5*m* and the second valve plate portion 51*n* of the second tilt valve 52*n*, as illustrated in FIG. 4, the heated fluid circulates through the first heat exchange branch path ER1 and the second heat exchange branch path ER2 of the base structure 2 as indicated by the thick two-dot chain line arrow to heat the heating target fluid flowing through the flat circulation tube 41 of the first heat exchange branch path ER1 and the flat circulation tube 41 of the second heat exchange branch path ER2. For example, when the temperature of the heating target fluid reaches the predetermined temperature or higher, the thermal actuator 6 opens the first valve plate portion 51*m* of the first tilt valve 5*m* and the second valve plate portion 51*n* of the second tilt valve 52*n* to stop heating and heat exchange of the heating target fluid.

According to the heat exchange device 1 of the present embodiment, heated fluid flows to the plurality of heat exchange branch paths ER1 and ER2 in which the heat exchange portion 4 through which the heating target fluid flows is arranged at the time of heat exchange. In this way, the range in which heat can be exchanged between the heated fluid having a higher temperature and the heating target fluid can be increased, and heat exchange can be performed efficiently to obtain excellent heat exchange performance. In addition, since the range in which heat can be exchanged between the heated fluid having a higher temperature and the heating target fluid can be increased, it is not necessary to increase the heat exchange area of the heat exchange portion and lengthen the total length of the heat exchange portion and the heat exchange device. Therefore, the length and the size of the heat exchange portion 4 and the heat exchange device 1 can be reduced.

Further, the plurality of flat circulation tubes 41 are arranged side by side at intervals in the thickness direction to form the heat exchange portion 4, and the flat surface 411 of the flat circulation tube 41 extends in the flow direction of the fluid circulating through the base structure 2. As a result, the heat exchange area can be increased by the flat surface 411 of the flat circulation tube 41, and heat exchange can be performed more efficiently. Moreover, the length or distance of the flat surface 411 extending in the fluid flow direction of the base structure 2 can be shortened. Furthermore, the length of the heat exchange portion 4 composed of the flat circulation tube 41 and the length of the heat exchange portion 4 in the flow direction of the heated fluid can be shortened. Further, due to the shape and arrangement of the flat circulation tubes 41, the pressure loss of the fluid circulating through the base structure 2 can be reduced, and a smooth fluid flow can be ensured. For example, when the exhaust gas of an internal combustion engine of an automobile flows in the base structure 2, the back pressure of the internal combustion engine can be reduced by the reduced pressure loss, and the exhaust efficiency, the intake efficiency, and the combustion efficiency of the internal combustion engine can be improved.

Further, since the detour path DR is arranged between the first heat exchange branch path ER1 on one side of the bulges on both sides of the bulging portion 23 and the second heat exchange branch path ER2 on the other side, it is possible to secure a desirable flow path diameter through which the fluid circulates during both heat exchange and non-heat exchange. Further, it is possible to basically maintain the flow of the fluid from the fluid introducing portion 21 during non-heat exchange and allow it to flow through the detour path DR. Moreover, it is possible to distribute the flow of the fluid from the fluid introducing portion 21 in a substantially equalized manner during heat exchange to allow the fluid to flow through the first heat exchange branch path ER1 and the second heat exchange branch path ER2 without causing a large change such that a large turbulent flow or a large vortex flow is generated. Therefore, the pressure loss of the fluid circulating through the base structure 2 can be further reduced during both non-heat exchange and during heat exchange, and a smoother fluid flow can be ensured.

The first valve plate portion 51m of the first tilt valve 5m that regulates the inflow of the fluid into the first heat exchange branch path ER1 and the second valve plate portion 51n of the second tilt valve 5n that regulates the inflow of the fluid into the second heat exchange branch path ER2 are in contact with each other so that the tips thereof form a substantially V-shape toward the upstream side. Therefore, the flow of fluid can be equalized by the first heat exchange branch path ER1 and the second heat exchange branch path ER2, and the pressure loss of the fluid can be further reduced. Further, the tip of either the first valve plate 51m or the second valve plate 51n covers the other tip to regulate the inflow of the fluid into the detour path DR. Therefore, the inflow of fluid into the detour path DR can be more reliably regulated during heat exchange. Further, since the tip of either the first valve plate 51m or the second valve plate 51n covers the other tip, the contact and the closed state of the first valve plate portion 51m and the second valve plate portion 51n whose tips face the upstream side can be more reliably prevented from being released due to the flow of the fluid in the base structure 2.

[Scope of Invention Disclosed in this Specification]

The invention disclosed in this specification includes, in addition to the configurations according to respective inventions or embodiments, a matter defined by modifying any of these partial configurations into other configurations disclosed in this specification within an applicable range, a matter defined by adding any other configurations disclosed in this specification to these partial configurations, or a matter defined into a generic concept by cancelling any of these partial configurations within a limit that achieves a partial operational advantage. The invention disclosed in this specification further includes the following modifications and the added matters.

For example, in the heat exchange device 1 of the above-described embodiment, an example in which the heated fluid is circulated from the fluid introducing portion 21 of the base structure 2 toward the fluid discharging portion 22, and the heating target fluid is circulated in the flat circulation tube 41 of the heat exchange portion 4 has been described. However, the present invention also includes a configuration in which the heating target fluid is circulated from the fluid introducing portion 21 of the base structure 2 toward the fluid discharging portion 22 and the heated fluid is circulated in the flat circulation tube 41 of the heat exchange portion 4. In this case, the range in which heat can be exchanged between the heated fluid having a higher temperature and the heating target fluid can be increased, and heat exchange can be performed efficiently to obtain excellent heat exchange performance. In addition, since the range in which heat can be exchanged between the heated fluid having a higher temperature and the heating target fluid can be increased, it is not necessary to increase the heat exchange area of the heat exchange portion and lengthen the total length of the heat exchange portion and the heat exchange device. Therefore, the length and the size of the heat exchange portion 4 and the heat exchange device 1 can be reduced.

Further, the configuration of the switching portion that can be switched so that the flow of the heated fluid or the heating target fluid circulating through the base structure 2 is regulated to either the heat exchange path or the detour path DR is not limited to the tilt valves 5m and 5n of the above-described embodiment, but can be appropriately modified within the scope of the spirit of the present invention. Further, the configuration of the base structure 2 in the present invention can be appropriately modified within the scope of the gist of the present invention, and is not limited to the half bodies 24a and 24b of the above-described embodiment.

Further, in the above-described embodiment, the heat exchange path is composed of two heat exchange branch paths ER1 and ER2. However, the present invention may include a plurality of heat exchange branch paths constituting the heat exchange path if the number is two or more. Further, the plurality of heat exchange branch paths ER1, ER2, and the like are preferably arranged at predetermined intervals in the circumferential direction of the base structure 2 or the like, and the detour path DR or the like is preferably arranged on the inner side of the plurality of heat exchange branch paths ER1, ER2, and the like. With this configuration, it is possible to basically maintain the flow of the fluid from the fluid introducing portion 21 or the like during non-heat exchange and allow it to flow through the detour path DR or the like. Moreover, it is possible to distribute the flow of the fluid from the fluid introducing portion 21 or the like substantially equalized manner during heat exchange to allow the fluid to flow through the heat exchange branch paths ER1, ER2, and the like without causing a large change such that a large turbulent flow or a large vortex flow is generated.

Further, when the heat exchange portions 4 provided in the heat exchange branch paths ER1, ER2, and the like have the same configuration or the same performance, respectively, and the flow rate or the flow velocity of the heated fluid or the heated fluid circulated through the heat exchange branch paths ER1, ER2, and the like is substantially the same, it is preferable because the heat exchange efficiency can be further improved. Further, the arrangement of the heat exchange branch paths and the detour path constituting the heat exchange path in the base structure is not limited to the above-described embodiment, but can be appropriately modified within the scope of the gist of the present invention.

Further, the heated fluid and the heating target fluid in the heat exchange device of the present invention may be an appropriate liquid or gas that can be applied. The heating target substance in the heat exchange device of the present invention also includes a heating target solid such as a heat utilization device of the heating target solid as well as the heating target fluid, and the heating substance in the heat exchange device of the present invention also includes a heating solid as well as a heated fluid. Further, the heat exchange device of the present invention is suitably used as, for example, a heat exchange device installed in an automobile, but other appropriate heat exchange devices can be used.

Figure 5:
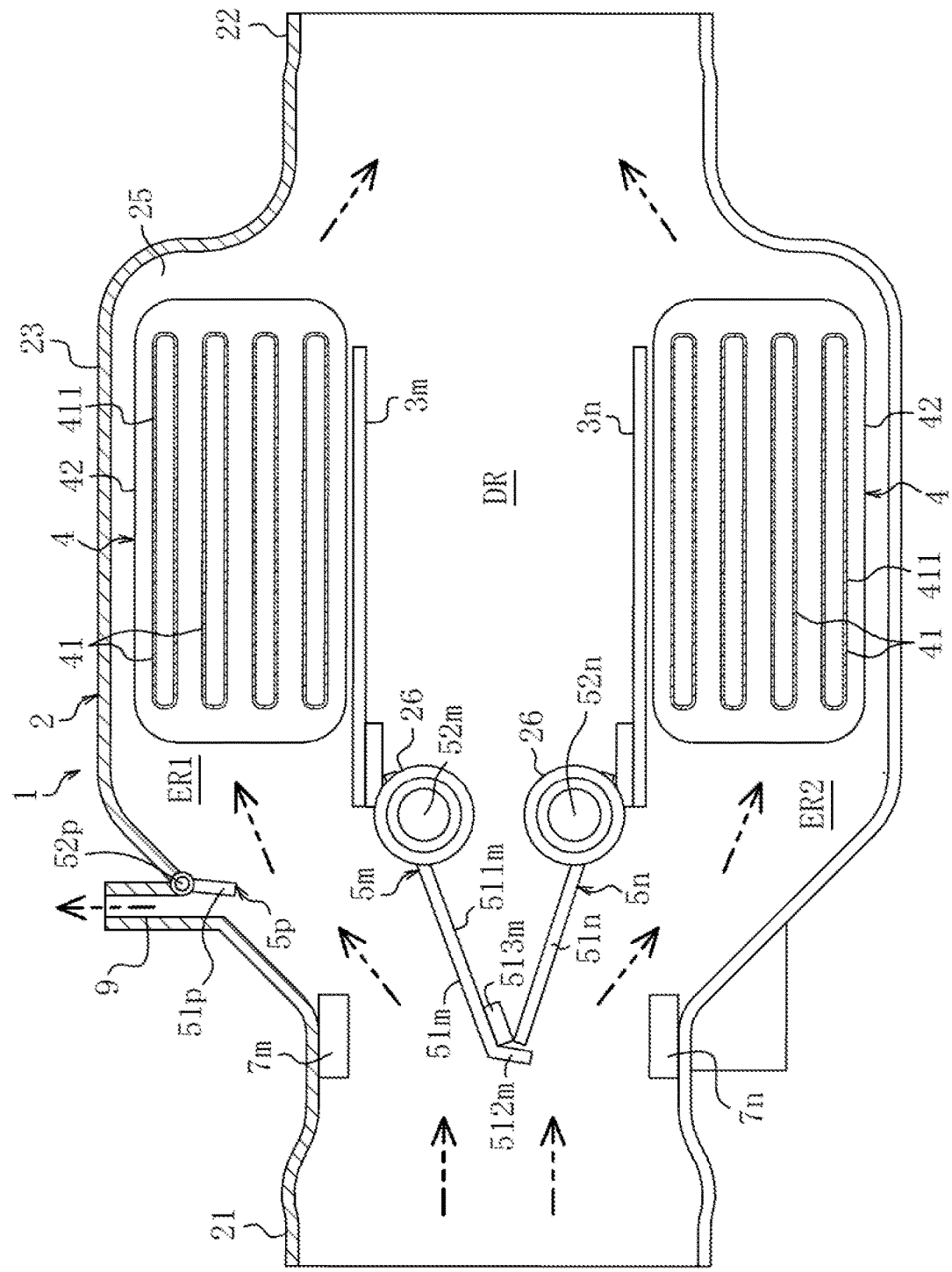
FIG. 5 is a longitudinal section explanatory view of a heat exchanger of a modified example of the embodiment.

Further, in the heat exchange device of the present invention, as illustrated in FIG. 5, the usage path 9 for the heated fluid or the heating target fluid circulating through the base structure 2 may be provided in the base structure 2 separately from the heat exchange path and the detour path DR, and the switching portion may be configured to introduce a portion of the flow of the heated fluid or the heating target fluid circulating through the base structure 2 into the usage path 9. The switching portion of the example of FIG. 5 has a third tilt valve 5p composed of a third valve plate portion 51p and a shaft portion 52p in addition to the first tilt valve 5m and the second tilt valve 5n, and the third tilt valve 5p is configured to introduce a portion of the flow of the heated fluid or the heating target fluid circulating through the base structure 2 into the usage path 9 or restrict the entering thereof. It is preferable that the third tilt valve 5p can be opened and closed independently from the first tilt valve 5m and the second tilt valve 5n in response to a control command or the like from a control device. According to this configuration example, the heated fluid or the heating target fluid introduced into the utilization path 9 can be utilized for various purposes such as, for example, heating the wall surface on which a thermoelectric conversion element is arranged, generating power by a power generation device in which a thermoelectric conversion element is arranged, or cooling the wall surface for cooling in addition to the heat exchange function.

INDUSTRIAL APPLICABILITY

The present invention can be used, for example, when exhaust heat is recovered from an exhaust gas of an internal combustion engine of an automobile.

REFERENCE SIGNS LIST

1: Heat exchange device
2: Base structure
21: Fluid introducing portion
22: Fluid discharging portion
23: Bulging portion
24a, 24b: Half body
241a: Fitting portion
241b: Fitting target portion
25: Wall portion
26: Bearing
3m, 3n: Separator
4: Heat exchange portion
41: Flat circulation tube
411: Flat surface
42: Fin
5m: First tilt valve
51m: First valve plate portion
511m: Base portion
512m: Cover
513m: receiving part
52m: Shaft
5n: second tilt valve
51n: second valve plate
52n: Shaft portion
5p: third tilt valve
51p: third valve plate portion
52p: Shaft portion
6: Thermal actuator
7m, 7n: Receiving portion
81, 82: Circulation connection unit
821: Connecting cover
822: Fluid introduction pipe
823: Fluid discharging pipe
9: Usage path
ER1: first heat exchange branch path
ER2: Second heat exchange branch path
DR: Detour path

The invention claimed is:

1. A heat exchange device in which:
a heat exchange path composed of a plurality of heat exchange branch paths and a detour path are provided inside a base structure having a fluid introducing portion and a fluid discharging portion;
a heat exchange portion is arranged in each of the heat exchange branch paths;
a switching portion is provided that can switch a flow of heated fluid or a heating target fluid circulating through the base structure so as to be regulated to at least either the heat exchange path or the detour path;
a plurality of heat exchange branch paths are arranged at predetermined intervals in a circumferential direction of the base structure,
the detour path is arranged inside the plurality of heat exchange branch paths;
a bulging portion is formed between the fluid introducing portion and the fluid discharging portion of the base structure so as to bulge on both sides,
the heat exchange path includes a first heat exchange branch path and a second heat exchange branch path,
the first heat exchange branch path and the second heat exchange branch path are provided on one side and the other side of the bulges on both sides of the bulging portion, and
the detour path is arranged between the first heat exchange branch path and the second heat exchange branch path;
the switching portion includes a first tilt valve that regulates the inflow of the fluid circulating through the base structure into the first heat exchange branch path, and a second tilt valve that regulates the inflow of the fluid circulating through the base structure into the second heat exchange branch path, and
a first tip opposite to a first shaft connected portion of the first valve plate portion of the first tilt valve and a second tip opposite to a second shaft connecting portion of the second valve plate portion of the second tilt valve are in direct contact with each other so that the first tip and the second tip form a substantially V-shape such that both the first tip and the second tip are positioned toward the upstream side, and either the first tip covers the second tip or vice versa, and regulate the inflow of the fluid circulating through the base structure into the detour path.

2. The heat exchange device according to claim 1, wherein
the heat exchange portion includes a plurality of flat circulation tubes arranged side by side at intervals in a thickness direction, and
a flat surface of the flat circulation tube through which fluid flows extends in a flow direction of the fluid flowing through the base structure.

3. The heat exchange device according to claim 2, wherein
a usage path of the heated fluid or the heating target fluid circulating through the base structure is provided in the base structure separately from the heat exchange path and the detour path, and the switching portion can introduce a portion of the flow of the heated fluid or the heating target fluid circulating through the base structure into the usage path.

4. The heat exchange device according to claim 1, wherein a usage path of the heated fluid or the heating target fluid circulating through the base structure is provided in the base structure separately from the heat exchange path and the detour path, and the switching portion can introduce a portion of the flow of the heated fluid or the heating target fluid circulating through the base structure into the usage path.

* * * * *